Dec. 7, 1965   S. G. HAW   3,221,382
METHOD OF MAKING A HOT TOP
Original Filed April 16, 1963   2 Sheets-Sheet 1
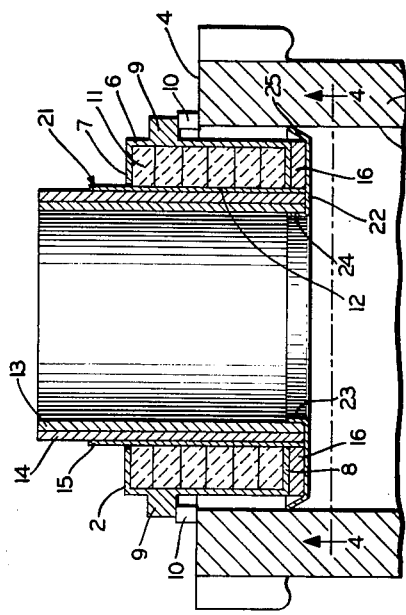
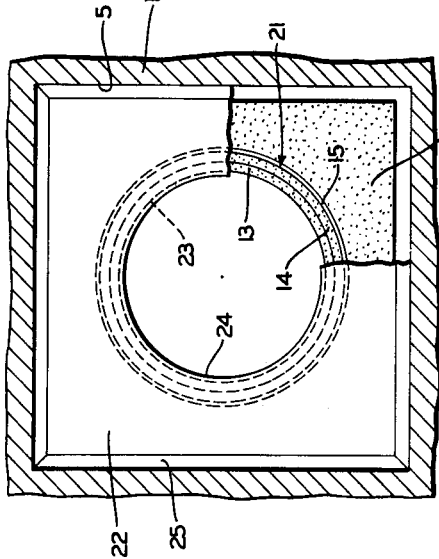
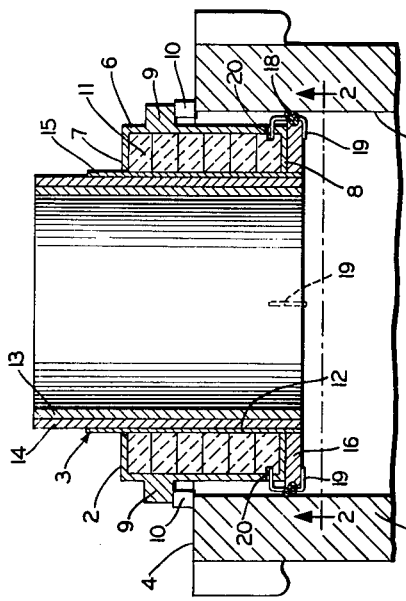
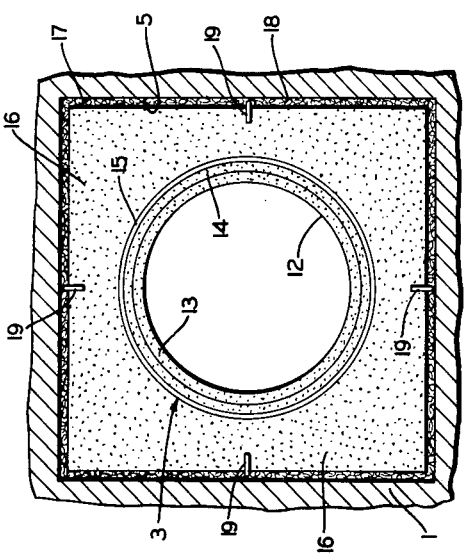
INVENTOR.
Sherwood G. Haw
BY
Frease, Bishop, Johns & Schick
ATTORNEYS Dec. 7, 1965  S. G. HAW  3,221,382
METHOD OF MAKING A HOT TOP
Original Filed April 16, 1963  2 Sheets-Sheet 2

INVENTOR.
Sherwood G. Haw
BY
Frease, Bishop, Johns & Schick
ATTORNEYS 3,221,382
METHOD OF MAKING A HOT TOP
Sherwood G. Haw, 1117 Fair Oaks Ave. S.,
North Canton, Ohio
Original application Apr. 16, 1963, Ser. No. 273,422, now Patent No. 3,153,823, dated Oct. 27, 1964. Divided and this application May 28, 1964, Ser. No. 371,040
10 Claims. (Cl. 22—193)

This application is a division of my copending application for Unitized Hot Top Liner, Serial No. 273,422, filed April 16, 1963, now Patent No. 3,153,823, issued October 27, 1964.

This invention relates to hot tops for use on ingot molds and more particularly it pertains to a method of preparing a precast hot top liner for conventional hot tops.

Exothermic materials have been used in refractory-lined hot tops for ingot molds. The ultimate purpose of the exothermic material is to increase the percentage of sound metal in the ingot. For that purpose, exothermic materials have been applied in a variety of ways for improving hot top efficiency.

Several types of hot tops have been developed in the past. They include one-piece clay hot tops and metal hot tops having a refractory and/or an exothermic lining. The one-piece clay hot top is a one-use product. The refractory-lined metal hot top may be used repeatedly before the refractory lining is replaced provided the lining is satisfactorily coated prior to each use. Hot tops of prior construction have been of relatively large volume to overcome heat loss. The use of exothermic materials with the hot top overcomes the heat loss to such an extent that smaller hot tops can be used.

Associated with the foregoing is the problem of the cost of the one-piece clay type as well as maintenance of the reusable type of metal hot top; that is, laborious placement of various pieces used, such as the ceramic ring, applying a coating to the brick, and/or inserting exothermic sections and sealing with cement. A need for reducing or eliminating such costs is desirable, particularly in conjunction with exothermic material.

It has been found that a unitized hot top liner composed of layers of exothermic and refractory materials may be provided for hot tops of any size and shape. Such a liner eliminates the necessity of maintaining a hot top because it prevents the molten metal from contacting the hot top. A unitized hot top liner also seals the molten metal at the zone of clearance between the hot top and the ingot mold.

Moreover, it has been found that a hot top liner with exothermic and refractory layers may be used without the conventional hot top which includes a heavy metal casing as a support means.

Accordingly, it is an object of this invention to provide a unitized hot top liner which provides a readily attachable liner for a conventional refractory-lined hot top.

It is another object of this invention to provide a unitized hot top liner having an inner layer of insulating and/or exothermic material secured to an outer layer of refractory material.

It is another object of this invention to provide a replaceable unitized hot top liner having an upper tubular portion having a lower radial integral flange portion which is capable of ready insertion into and to prevent molten metal contact with a refractory-lined hot top.

It is another object of this invention to provide a unitized hot top liner having a lightweight layer of refractory material.

It is another object of this invention to provide a unitized hot top liner having a refractory portion and an exothermic portion and a radial refractory integral flange which is processed in a minimum of time.

Finally, it is an object of this invention to provide a unitized hot top liner which eliminates difficulties heretofore encountered in the art; satisfies the several steps in assembly and subsequent processing; eliminates costly manufacturing and maintenance problems heretofore involved; and achieves the stated objects in a simple and inexpensive manner.

These and other objects and advantages apparent to those skilled in the art from the following description and claims may be obtained, the stated results achieved, and the described difficulties overcome, by the methods, steps, procedures, operations, apparatus, parts, elements, and combinations which comprise the present invention, the nature of which is set forth in the following general statements, preferred embodiments of which—illustrative of the best mode in which applicant has contemplated applying the principles—is set forth in the following description and shown in the drawings, and which are particularly and distinctly pointed out and set forth in the appended claims forming part hereof.

The nature of the improved method of manufacturing unitized hot top liners of the present invention may be stated in general terms as including the steps of pouring a waterless mixture of refractory material with thermosetting binder into a tubular mold to form an outer vertical tubular sleeve, pouring a waterless mixture of exothermic material with thermosetting binder into a tubular mold to form an inner vertical tubular sleeve, pouring a waterless mixture of refractory material with binder into a mold extending horizontally from the lower ends of the outer mold to form a radial flange-like base integral with the outer vertical sleeve, applying a wiper strip to the outer periphery of the flange-like base, vibrating the waterless mixtures within the mold into a compact status substantially devoid of air pockets and crevices, removing a mold partition between the inner and outer waterless mixtures, baking the assembled members at the curing temperature of the thermosetting binder to form rigid exothermic refractory liners, and stripping the vertical sleeve from the inner liner.

The nature of the improved apparatus of the present invention may be stated in general terms as including a hot top having upper and lower end walls forming upper and lower hot top open ends and mounted on the upper end of an ingot mold, a preformed tubular liner for the hot top and having upper and lower open ends, a flange-like base integral with the lower end portion of the liner and being laterally coextensive with the lower end wall of the hot top, the base providing a clearance space with the inner side walls of the mold, wiper strip means for the clearance space and mounted on the periphery of the base and engageable with said inner walls of the mold for providing a liquid metal trap, the tubular liner including an inner layer of exothermic material and an outer layer of refractory material, the inner layer of exothermic material including 30 to 40% aluminum particles of which ⅔ has a −20 mesh size and ⅓ has a −30 mesh size, 18 to 25% $MnO_2$ having a −40 mesh size, 1 to 3% $Na_2SiF_6$ having a −65 mesh size, 5 to 30% alumina having a −14 mesh size and 8 to 15% plastic resin having a −100 mesh size; and the outer refractory layer having 1 to 20% urea or phenol microballoons.

By way of example, the method and apparatus of the present invention is shown in the accompanying drawings wherein:

FIGURE 1 is a fragmentary vertical sectional view of a unitized hot top liner mounted in a conventional refractory-lined hot top mounted on the upper end of an ingot mold;

FIGURE 2 is a bottom view taken on the line 2—2 of FIGURE 1;

FIGURE 3 is a fragmentary vertical sectional view of another embodiment of a unitized hot top liner;

FIG. 4 is a bottom view taken on the line 4—4 FIG. 3;

Similar numerals refer to similar parts throughout the several views of the drawings.

Figure 5:
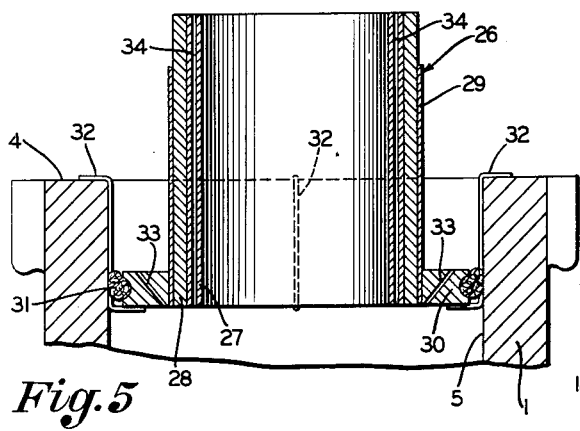
FIG. 5 is a fragmentary vertical sectional view of another embodiment of a unitized hot top liner mounted within a conventional refractory-lined hot top within the upper end of an ingot mold.

In FIG. 1 an ingot mold 1 is provided with a hot top 2 in which is mounted a unitized hot top liner 3. The ingot mold is of conventional construction and has a mold upper end wall 4 and an inner wall 5. The hot top 2 generally includes an outer metal wall 6 with upper and lower inturned flanges 7 and 8. In addition, a pair of outturned ears 9 are provided for mounting the hot top 2 in place on the upper end 4 of the mold 1. For that purpose a pair of blocks 10, preferably composed of wood, are mounted between the ears 9 and the upper wall 4 of the mold 1.

The hot top 2 is also provided with inner refractory lining 11 which may be composed of insulating or fireclay brick. The lining 11 provides an inner hot top surface 12 (FIG. 6) which may be rectangular or circular in horizontal cross section depending upon the particular type of hot top used as well as the shape of the inner wall 5 of the mold. The refractory lining 11 is held in place by cement in a conventional manner.

The unitized hot top liner 3 includes an inner layer 13 of exothermic material, an outer layer 14 of insulation or refractory material, an outer casing 15 of sheet metal, a radial flange 16 which extends outwardly from the lower end of the casing 15. However, use of the casing 15 is optional and may be omitted when used with a hot top. Like the outer layer 14 the radial flange 16 is composed of refractory material and has a horizontal cross section corresponding to the cross section of the inner wall 5. The flange 16 is permanently mounted on the lower end portion of the line 3.

As shown in FIG. 2 the radial flange 16 provides a clearance 17 with the inner wall 5 which clearance is closed by a wiper means 18 extending around and attached to the periphery of the flange 16. The thickness of the wiper means 18 is greater than the width of the clearance so that when the assembled hot top is in place, the wiper means 18 is compressed tightly between the flange 16 of the wall 5.

The liner 3 is disposed within the hot top 2 where it is held in place by spaced C-shaped wire clamps 19, the lower sides of which extend under the radial flange 16 and the upper sides of which extend into apertures 20 in the wall 6 of the hot top 2.

When molten metal is poured or teemed into the mold 1 the upper portion of the hot metal engages the underside of the flange 16 and the lower edges of the layers 13 and 14. The wiper means 18 prevents the hot metal from rising into and above the clearance 17 between the periphery of the flange 16 and the inner wall 5. Accordingly, the hot metal contacts only the surfaces of the liner 3 and does not contact any part of the hot top 2.

The wiper means 18 may be composed of a rope-like, elongated, closely enmeshed mass of wire threads, such as steel wool. As an alternative, it may be composed of a compacted mass of metal turnings or steel chips which are held in place within an outer casing of loosely woven metal threads. When the wiper means 18, composed of material such as enmeshed metal threads or chips, is compacted in the clearance between the radial flange 16 and the inner wall 5 of the mold, the wiper means serves as a barrier to the passage of molten metal which quickly solidifies in contact therewith. At the same time, the enmeshed mass of metal threads and chips is loose enough to permit subsequent removal of the hot top 2. The liner 3 and the flange remain with the solidified ingot.

Another embodiment of a unitized hot top liner is generally indicated at 21 in FIG. 3. It is mounted in the hot top 2 which is similar to the hot top 2 in FIG. 1. The hot top liner 21 resembles the liner 3 in that both include the inner layer 13 of exothermic material, the outer layer 14 of refractory or insulating-refractory material, the sheet metal casing 15, and the radial flange 16.

The hot top liner 21, however, differs from the liner 3 in that the liner 21 is provided with an annular pan 22 which is coextensive with the undersurfaces of the inner and outer layers 13 and 14, the casing 15, and the radial flange 16. The pan 22 has an upturned inner flange 23 which fits snugly against the inner cylindrical surface 13 and which forms an aperture 24 aligned with inner cylindrical chamber formed by the exothermic material 13. In addition, the pan 22 includes an upwardly inclined flange 25 which extends completely around the outer periphery of the radial flange 16 and which at its outer edge engages the inner wall 5 of the mold 1 in a substantially fluid-type manner. Inasmuch as the pan 22 is composed of sheet metal, the flange 25 is spring-biased against the mold wall 5 and serves as wiper means for preventing molten metal from rising above the flange in a manner similar to the wiper means 18 in FIG. 1.

Another embodiment of the invention is a liner-like hot top 26 (FIG. 5) which includes an inner layer 27 of exothermic material, an outer layer 28 of refractory or insulating-refractory material, a casing 29 of sheet metal, a radial flange 30, and wiper means 31 similar to the wiper means 18. Although the hot top 26 is preferably used as a liner in a conventional hot top 2 similar to the liner 3 (FIG. 1), the hot top 26 may be used without a conventional hot top 2, when provided with the reinforcing casing 29, as shown in FIG. 5. For that purpose, the hot top 26 is hung within the upper end portion of the mold 1 by a plurality of spaced Z-shaped wire hangers 32. The wiper means 31 engages the inner wall 5 of the mold 1 in a fluid-type manner.

To minimize the lifting effect of the hydrostatic pressure of molten metal upon the undersurface of the hot top 26, the radial flange 30 may be provided with a plurality of spaced apertures 33 which extend upwardly from the undersurface to the upper surface of the flange. The apertures 33 are preferably inclined inwardly and outwardly as shown in FIG. 5. When the level of the molten metal reaches the undersurface of the hot top 26, it enters the apertures 33 and solidifies. The solidified metal is part of an outer solidified crust which forms adjacent the mold wall 5 and the undersurface of the entire flange 30, whereby the lifting effects of hydrostatic pressure is overcome by the hold-down effects of the solidified metal in the mold.

As shown in FIG. 5 the inner layer 27 of exothermic material is provided with a plurality of spaced vertical apertures 34 extending throughout the length of the layer. The purpose of the apertures 34 is to provide vent holes for the escape of gases forming during the burning of the exothermic material of the layer and are prevented from escaping into the molten metal in the hot top.

Figure 8:
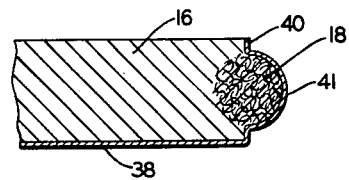
FIG. 8 is an enlarged fragmentary vertical sectional view showing an outer peripheral portion of the liner.
Figure 7:
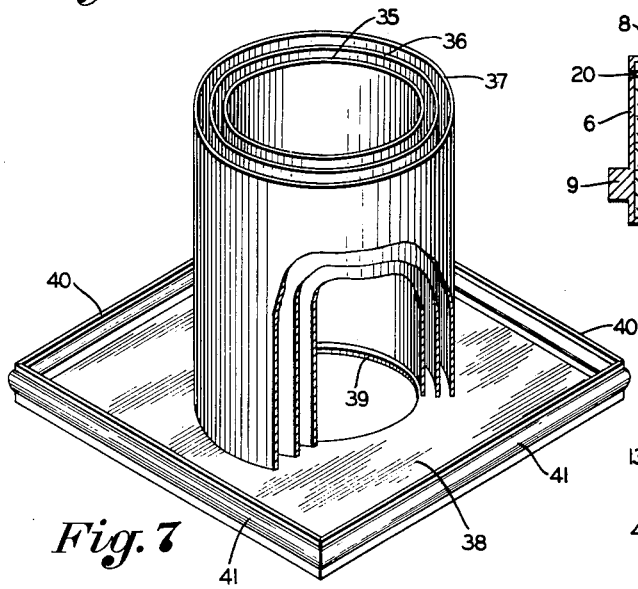
FIG. 7 is a perspective view of a form having broken away portions showing the manner in which unitized hot top liners may be manufactured.
Figure 9:
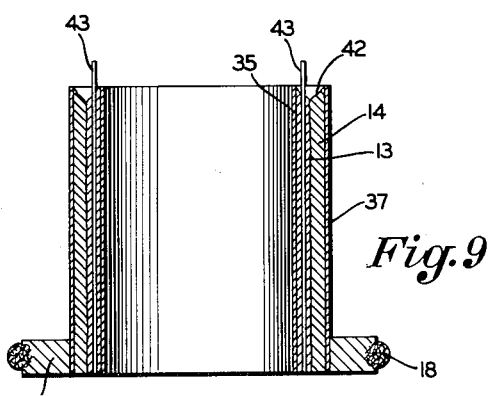
FIG. 9 is a vertical sectional view showing a modified intermediate stage of production of the liner.

The method by which the hot tops 3, 21, and 26 are manufactured is shown in FIGS. 7, 8, and 9. Three cylindrical members 35, 36, and 37, preferably composed of sheet metal, are mounted concentrically on a base plate 38. The inner cylindrical member 35 is seated around an opening 39 which is centered with respect to the edges of the plate 38. The cylindrical members 36 and 37 are of larger diameter and are spaced equally around the member 35 and each other by conventional spacer means not shown in the drawings. The annular space between the members 35 and 36 is then filled with an exothermic material and the cylindrical space between the members 36 and 37 is filled with a refractory material. The base plate 38 is then covered with a refractory material to a level equal to the height of a peripheral flange 40. While the exothermic and refractory materials are poured into place, the entire assembly is vibrated to obtain compactness and avoid air voids therein.

In FIG. 8 the flange 40 of the base plate 38 may be provided with an outwardly molded portion 41 for holding the wiper means 18 in place during the manufacture of the hot top 3 or 26.

After the exothermic and refractory materials are poured into their respective molds, the member 36 is removed vertically and the exothermic and refractory materials flow together (FIG. 9) to fill the space previously occupied leaving a slight depressed space 42 at the upper ends of the layers 13 and 14. The depressed space is then filled with refractory material to provide a level top end and the assembly of the refractory and exothermic materials in the mold is baked in order to set the materials in a rigid status. Thereafter, the base plate 38 with the flange 40, as well as the inner cylindrical member 35, are removed. The cylindrical member 37 remains in place as an outer casing similar to the casing 15 of FIG. 1.

Inasmuch as it is desirable to provide the exothermic layer 13 or 27 with vertically extending apertures 34 (FIG. 5), the inner exothermic layer 13 is provided with a plurality of elongated vertical rods 43 after the exothermic material is poured into the mold between the members 35 and 36. The exothermic and refractory layers are set during baking and the rods 43 are removed leaving the apertures 34.

Figure 6:
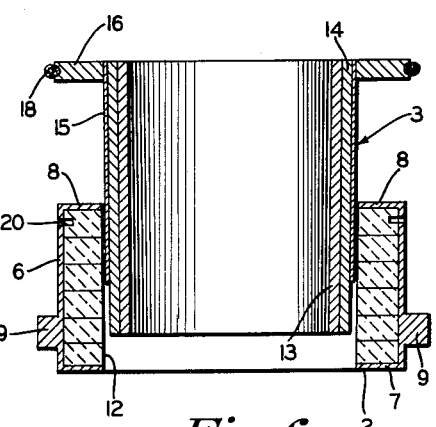
FIG. 6 is a vertical sectional view showing the manner in which a unitized hot top liner is lowered into an inverted conventional hot top.

The liners 3 and 21 may be inserted in the hot top 2, as shown in FIG. 6. The hot top 2 is turned over with the bottom side up and the liner 3 is lowered from the partially inserted position of FIG. 6. When the liner 3 is completely lowered into place so that the radial flange 16 is in contact with the inturned flange 8 of the hot top 2, the C-shaped wire clamps 19 are inserted in place and the hot top 2 with the liner 3 is ready then for use. The process of installing the liner 3 may be performed by unskilled labor.

The liner 3 when used in combination with the mold 1 serves as a complete shield or barrier between the molten metal and the hot top 2.

Figure 10:
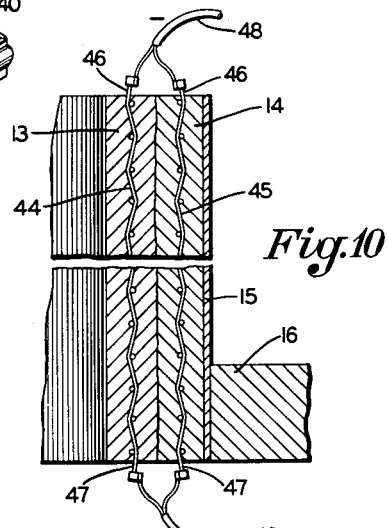
FIG. 10 is an enlarged fragmentary vertical sectional view showing an embodiment of the liner having a wire mesh embedded in the liner layers and having electrical terminals attached for heating the compositions of the layers to solid status.

As shown in FIG. 10, the exothermic layer 13 and the refractory layer 14 may be provided with reinforcing wire meshes 44 and 45, respectively, which are disposed substantially centrally of each layer. Each wire mesh 44 and 45 serves to reinforce each layer and to hold portions of the layer in place if they are damaged during shipment and would otherwise disintegrate. The wire meshes 44 and 45 may have an additional purpose of serving as wire heating elements for baking the materials of the layers 13 and 14 within the molds after being poured. Similar upper ends 46 and lower ends 47 of the wire meshes 44 and 45 may extend above and below the upper and lower ends of the respective layers 13 and 14 to which electrical lead lines 48 and 49 are attached. After the layers are set by the heat generated in the wire meshes 44 and 45 acting as heating elements, the lead lines 48 and 49 are removed and the upper and lower ends 46 and 47 are cut away.

The exothermic material used in the layer 13 ignites at a very high temperature when exposed to the temperature of molten metal which rises into the liner 3 during pouring of the molds. The material is composed of granular ingredients having the percentages, and mesh and screen size listed as follows:

| Ingredient: | Percentage | Mesh of screen |
|---|---|---|
| Aluminum particles | 30–41 | [1]—20 and —80 |
| $MnO_2$ | 18–25 | —40 |
| $Na_2SiF_6$ | 1–3 | —65 |
| Alumina | 5–30 | —14 |
| Resin Binder | 8–15 | —100 |

[1] Two-thirds of aluminum particles are minus 20 mesh, and one-third are minus 80 mesh.

The refractory layer 14 and the flange 16 may be composed of one of a number of several refractory mixtures such as follows:

| Ingredients: | Percentage |
|---|---|
| (a) Calcined Ohio Flint Clay | 92–95 |
| Phenolic Resin Binder | 5–8 |
| (b) Calcined Bauxite | 89–92 |
| Phenolic Resin Binder | 8–11 |
| (c) Silica | 90–95 |
| Phenolic Resin Binder | 5–10 |
| (d) Dolomite | 80–95 |
| Phenolic Resin Binder | 5–20 |

An alternate refractory formula for the refractory layer sleeve is as follows:

| Ingredients: | Percent range | Preferred percent |
|---|---|---|
| Urea or Phenol Microballoons | 10–20 | 20 |
| Bauxite, Calcined Flint, Silica | 60–80 | 60 |
| Phenolic Resin Binder | 10–20 | 20 |

Microballoons are miniature hollow particles of microscopic size, such as 5–5000 microns diameter and having wall thickness of .5–10% of the diameter. The microballoons are composed of film-forming material, as disclosed in Patent No. 2,797,201. The particles when used as an ingredient in a refractory sleeve, as set forth in the foregoing formula, may be composed of glass (silica), urea resin, or phenolic resin and is preferably composed of phenol formaldehyde. They are added preferably to the refractory mixture of the outer layer 14 in order to reduce the heat loss by reducing the heat capacity and thermal conductivity. An added advantage is reduction of weight of the unitized hot top 1. The microballoons permeate the entire refractory layer 14.

The microballoons may also be used in the exothermic layer 13 in order to further minimize the weight of the unitized hot top liner 3.

The plastic binders used in the foregoing compositions are thermosetting plastics such as phenol formaldehyde, vinyl resins, and urea formaldehyde.

After the granular formulation of exothermic and refractory compositions are poured into the vibrating molds, the member 36 is removed and the entire assembly in the mold is baked at an elevated temperature. Inasmuch as dry mixtures (devoid of water) are used the time for baking or setting both exothermic and refractory compositions is greatly reduced from the time required by prior methods. Where phenolic resin binders are used, the baking time is ten minutes to 2½ hours (depending upon the mass) at 400° F.–500° F. and preferably at 425° F. Where urea resin binders are used, the baking temperature range is 275° F.–300° F. and preferably at 300° F. for the same time. Thereafter, the assembly is cooled to room temperature and removed from the mold.

Another method of baking includes the use of embedded heat-resistant wire such as the wire mesh 44 and 45, as shown in FIG. 10. Still another method of baking or setting the exothermic material is that of placing the material in a field of induced current whereby the aluminum metal particles become heated and set the mixture. Such a procedure could be carried out in an induction heating coil. Moreover, the refractory material may be baked the same way when 5–30% metallic chips are included in the refractory mix.

The foregoing unitized hot top liner is provided by a dry process which is not limited as to the size of pressing equipment as in prior methods of making liner sleeves for hot tops. The liner is only limited by the size of the furnace in which the liner must be ultimately heated for baking or setting. Moreover, by the foregoing process, the only function performed within the furnace is baking and no time is wasted for preliminary drying, as is the case with wet mixtures of prior processes.

The primary advantage of the foregoing exothermic hot top liner is that it is of unitized construction which may be inserted as a complete unit into a hot top unit without the use of additional materials such as cement for holding it in place and without the necessity of assembling subassemblies which would require skilled labor. As a result of the foregoing, the unitized hot top liner functions with the ingot mold to completely isolate the reusable hot top from any contact with molten metal during the pouring and subsequent solidification of an ingot.

Associated with the foregoing is the advantage of reduced heat loss as well as lightness of weight incurred by the use of microballoons which facilitates the handling of the liners during shipment and storage.

The fundamental purpose of the liner is to provide heat for the steel in the hot top and to avoid boiling of the steel during burning of the exothermic liner. The very critical combination of the materials and their mesh size has been selected for that double purpose.

In the foregoing description, certain terms have been used for brevity, clearness and understanding, but no unnecessary limitations are to be implied therefrom beyond the requirements of the prior art, because such words are used for descriptive purposes herein and not for the purpose of limitation and are intended to be broadly construed.

Moreover, the invention is not limited to the exact apparatus shown because the particular arrangement of the parts may be varied to provide other structural embodiments without departing from the scope of the present invention.

Having now described the features of the invention, the construction and operation of a preferred embodiment of improved apparatus, the details of the steps of the improved method, and the advantageous, new and useful results obtained thereby, the new and useful inventions, methods, steps, procedures, operations, apparatus, parts, elements and combinations, discoveries, principles, and reasonable mechanical equivalents thereof, obvious to those skilled in the art, are set forth in the appended claims.

What is claimed is:

1. The method of providing a preformed liner for a hot top for an ingot mold comprising the steps of
   (a) pouring a waterless mixture of refractory material with thermosetting binder into a first tubular mold to form an outer vertical tubular sleeve,
   (b) pouring a waterless mixture of exothermic material with thermosetting binder into a second tubular mold within the first tubular mold for the refractory material to form an inner vertical tubular sleeve,
   (c) pouring a waterless mixture of refractory material with thermosetting binder into a mold extending horizontally from the lower ends of the outer mold to form a radial flange-like base integral with the outer vertical sleeve,
   (d) applying a wiper strip to the outer periphery of the flange-like base,
   (e) vibrating the waterless mixtures within the mold into a compact status substantially devoid of air pockets and crevices,
   (f) baking the assembled members at the curing temperature of the thermosetting binder to form rigid exothermic refractory liners, and
   (g) stripping the second tubular mold from the inner tubular sleeve.

2. The method of providing a preformed liner for a hot top for an ingot mold comprising the steps of
   (a) pouring a waterless mixture of refractory material with thermosetting binder into a first tubular mold to form an outer vertical tubular sleeve,
   (b) pouring a waterless mixture of exothermic material with thermosetting binder into a second tubular mold within and partitioned from the first tubular mold by a mold partition to form an inner vertical tubular sleeve,
   (c) pouring a waterless mixture of refractory material with thermosetting binder into a mold extending horizontally from the lower ends of the outer mold to form a radial flange-like base integral with the outer vertical sleeve,
   (d) applying a wiper strip to the outer periphery of the flange-like base,
   (e) vibrating the waterless mixtures within the mold into a compact status substantially devoid of air pockets and crevices,
   (f) removing the mold partition between the inner and outer waterless mixtures,
   (g) baking the assembled members at the curing temperature of the thermosetting binder to form rigid exothermic refractory liners, and
   (h) stripping the second tubular mold from the inner tubular sleeve.

3. The method of providing a preformed liner for a hot top for an ingot mold comprising the steps of
   (a) pouring a waterless mixture of refractory material with thermosetting binder into a first tubular mold to form an outer vertical tubular sleeve,
   (b) pouring a waterless mixture of exothermic material with thermosetting binder into a second tubular mold within and partitioned from the first tubular mold by a mold partition to form an inner vertical tubular sleeve,
   (c) pouring a waterless mixture of refractory material with thermosetting binder into a mold extending horizontally from the lower ends of the outer mold to form a radial flange-like base integral with the outer vertical sleeve,
   (d) vibrating the waterless mixtures within the mold into a compact status substantially devoid of air pockets and crevices,
   (e) removing the mold partition between the inner and outer waterless mixtures,
   (f) baking the assembled members at the curing temperature of the thermosetting binder to form rigid exothermic refractory liners, and
   (g) stripping the second tubular mold from the inner tubular sleeve.

4. The method of making a hot top for an ingot mold comprising the steps of preparing a waterless mixture of a refractory material and a thermosetting binder, preparing a waterless mixture of exothermic material and a thermosetting binder, forming a tubular member of the mixtures, forming a flange-like base composed of the refractory material and a thermosetting binder, around one end portion of the tubular member applying a wiper strip to the outer periphery of the flange-like base, and baking the tubular member with the base attached at the curing temperature of the thermosetting binder to form an integral unit of the member and the base.

5. The method of making a hot top for an ingot mold comprising the steps of preparing a dry mixture of a refractory material and a thermosetting binder, preparing a waterless mixture of exothermic material and a thermosetting binder, introducing the dry mixtures into a tubular mold to form a tubular sleeve, forming a flange-like base composed of the mixture around the lower end portion of the sleeve, applying a wiper strip to the outer periphery of the flange-like base, baking the assembled sleeve and base at the curing temperature of the thermosetting binder to form a rigid refractory liner, and removing the mold from the resulting rigid sleeve.

6. The method of making a hot top for an ingot mold comprising the steps of preparing a waterless mixture of refractory material and thermosetting binder, preparing a waterless mixture of an exothermic material and a thermosetting binder, placing the refractory material mixture into an outer tubular mold to form an outer sleeve, placing the waterless mixture of exothermic material into an inner tubular mold which is partitioned from the outer tubular mold by a mold partition to form an inner sleeve, placing a radial flange-like base composed of the waterless mixture of refractory material on and around one end portion of the sleeve, applying a wiper strip to the outer periphery of the flange-like base removing the mold partition separating the refractory and exothermic mixtures, baking the assembly at the curing temperature of the thermosetting binder, and removing the inner tubular mold from the resulting rigid sleeve.

7. The method of providing a hot top for an ingot mold comprising the steps of pouring a waterless mixture of the refractory material with thermosetting binder into a first tubular mold to form an outer vertical tubular sleeve, pouring a waterless mixture of exothermic material with thermosetting binder into a second tubular mold within and partitioned from the outer sleeve of refractory material to form an inner vertical tubular sleeve, pouring a waterless mixture of refractory material with thermosetting binder into a mold extending horizontally outwardly from the lower end of the outer mold to form a radial flange-like base integral with the outer vertical sleeve, applying a wiper strip to the outer periphery of the flange-like base baking the assembled members at the curing temperature of the thermosetting binder to form rigid exothermic refractory liners, and stripping the second tubular mold from the resulting rigid sleeve.

8. The method of providing a hot top for an ingot mold comprising the steps of pouring a waterless mixture of refractory material with thermosetting binder into a first tubular mold to form an outer vertical tubular sleeve, pouring a waterless mixture of exothermic material with thermosetting binder into a second tubular mold within and partitioned from the first tubular mold by a mold partition to form an inner vertical tubular sleeve, pouring a waterless mixture of refractory material with thermosetting binder into a radial mold extending horizontally outwardly from the lower end of the outer sleeve to form a radial flange-like base integral with the outer sleeve, applying a wiper strip to the outer periphery of the flange-like base removing the mold partition between the inner and outer waterless mixtures, baking the assembled members at the curing temperature of the thermosetting binder to form rigid sleeve units, and stripping the second tubular mold from the inner sleeve.

9. The method of providing a hot top for an ingot mold comprising the steps of pouring a waterless mixture of refractory material with thermosetting binder into a tubular mold to form an outer vertical tubular sleeve, pouring a waterless mixture of exothermic material with thermosetting binder into a tubular mold within the tubular mold for the refractory material to form an inner vertical tubular sleeve, pouring a waterless mixture of refractory material with thermosetting binder into a mold extending horizontally from the lower ends of the outer mold to form a radial flange-like base integral with the outer vertical sleeve, applying a wiper strip to the outer periphery of the flange-like base, baking the assembled members at the curing temperature of the thermosetting binder to form rigid exothermic refractory units, and stripping the mold from the inner sleeve.

10. The method of providing a hot top for an ingot mold comprising the steps of pouring a waterless mixture of refractory material with thermosetting binder into a tubular mold to form an outer vertical tubular sleeve, pouring a waterless mixture of exothermic material with thermosetting binder into a tubular mold within the tubular mold for the refractory material to form an inner vertical tubular sleeve, pouring a waterless mixture of refractory material with thermosetting binder into a mold extending horizontally from the lower ends of the outer mold to form a radial flange-like base integral with the outer vertical sleeve, applying a wiper strip to the outer periphery of the flange-like base, removing a mold partition between the inner and outer waterless mixtures, baking the assembled members at the curing temperature of the thermosetting binder to form rigid exothermic refractory units, and stripping the vertical sleeve from the inner sleeve.

References Cited by the Examiner

UNITED STATES PATENTS

| | | | |
|---|---|---|---|
| 1,789,883 | 1/1931 | Roth | 22—147 |
| 2,361,386 | 10/1944 | Eayrs | 22—147 |
| 2,591,105 | 5/1952 | Strauss et al. | 22—147 |
| 2,644,218 | 7/1953 | Kennison | 264—262 |
| 2,863,192 | 12/1958 | Kauffman | 22—147 |
| 2,869,191 | 1/1959 | Cooper et al. | 22—147 |
| 2,925,637 | 2/1960 | Edmonds et al. | 22—147 |
| 2,944,307 | 7/1962 | Cherry et al. | 22—9 |
| 3,112,541 | 12/1963 | Bohm et al. | 22—147 |

FOREIGN PATENTS 897,609   5/1962   Great Britain.

MARCUS U. LYONS, *Primary Examiner.*